United States Patent [19]
Smith

[11] Patent Number: 5,980,412
[45] Date of Patent: Nov. 9, 1999

[54] CAM FOLLOWER AUTOMATIC TORQUE CONVERTER TRANSMISSION

[76] Inventor: Frank D. Smith, 115 Joshua's Way, Eastham, Mass. 02642

[21] Appl. No.: 08/971,484

[22] Filed: Nov. 15, 1997

[51] Int. Cl.[6] .............................. F16H 21/14; B62M 9/08
[52] U.S. Cl. .................................. 475/169; 74/64; 74/69; 280/236
[58] Field of Search .................................. 74/63, 64, 68, 74/69; 475/183, 189, 196, 169, 170; 476/36, 38; 280/236

[56] References Cited

U.S. PATENT DOCUMENTS

| | | | |
|---|---|---|---|
| 1,753,784 | 4/1930 | Herzog | 475/170 X |
| 2,490,525 | 12/1949 | Koller | 476/38 X |
| 3,087,355 | 4/1963 | Bassereau | 74/69 X |
| 3,286,536 | 11/1966 | Hallmann | 74/69 X |
| 3,793,895 | 2/1974 | Wright | 74/63 |
| 3,798,989 | 3/1974 | Hunt | 74/244 |
| 3,969,948 | 7/1976 | Pipenhagen | 280/236 X |
| 4,030,373 | 6/1977 | Leonard | 74/230.19 |
| 4,119,326 | 10/1978 | Porter | 280/236 |
| 4,129,044 | 12/1978 | Erickson et al. | 280/236 X |
| 4,179,943 | 12/1979 | Gamba | 74/64 |
| 4,497,221 | 2/1985 | Koser | 475/169 X |
| 4,701,152 | 10/1987 | Dutil et al. | 474/70 |
| 4,836,046 | 6/1989 | Chappel | 280/236 X |
| 4,953,882 | 9/1990 | Craig | 280/236 X |
| 4,976,658 | 12/1990 | Hood | 280/236 X |
| 4,983,151 | 1/1991 | Pires | 475/170 |
| 5,199,929 | 4/1993 | Stites | 474/54 |
| 5,236,403 | 8/1993 | Schievelbusch | 280/236 X |
| 5,312,306 | 5/1994 | Folino | 476/36 X |
| 5,318,486 | 6/1994 | Lutz | 476/38 X |
| 5,352,162 | 10/1994 | Coronel | 475/170 X |
| 5,515,746 | 5/1996 | Yamaguchi | 74/68 X |
| 5,546,822 | 8/1996 | Fowler | 74/113 |
| 5,577,423 | 11/1996 | Mimura | 476/36 X |

*Primary Examiner*—Charles A. Marmor
*Assistant Examiner*—Scott Lund

[57] ABSTRACT

A fully automatic infinitely variable torque converter bicycle transmission makes use of cam followers acting between a driver wheel connected with an input and a follower wheel connected with an output. Torque is varied by varying a radial position of the cam followers relative to the driver wheel and the follower wheel, wherein a return of the cam followers toward an outer radial position is delayed. All force transmitting components of the apparatus are mechanically engaged without relying on friction.

6 Claims, 6 Drawing Sheets

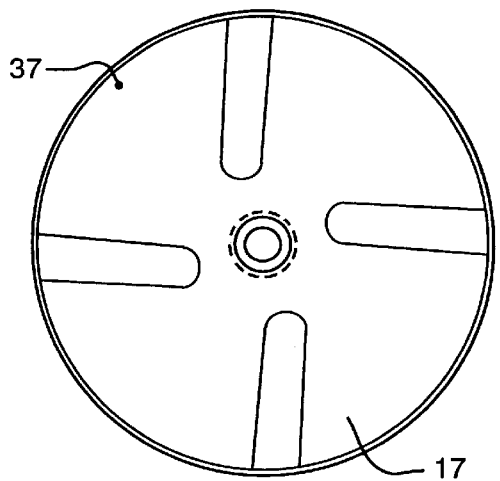
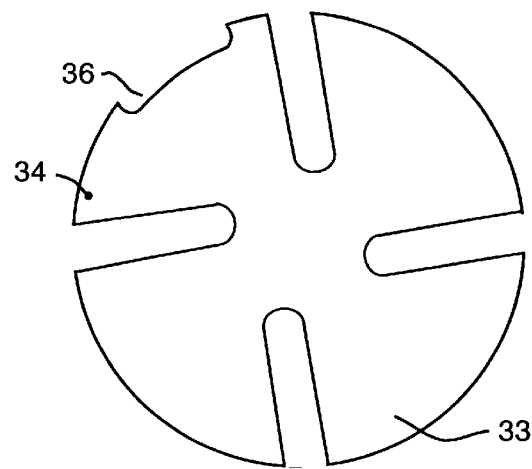
FIG. 5A
FIG. 5B
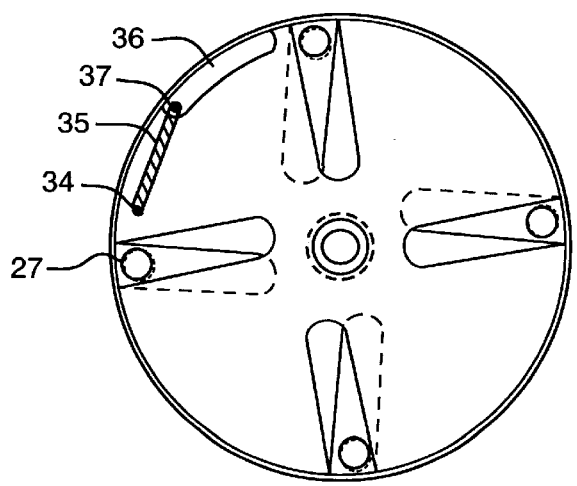
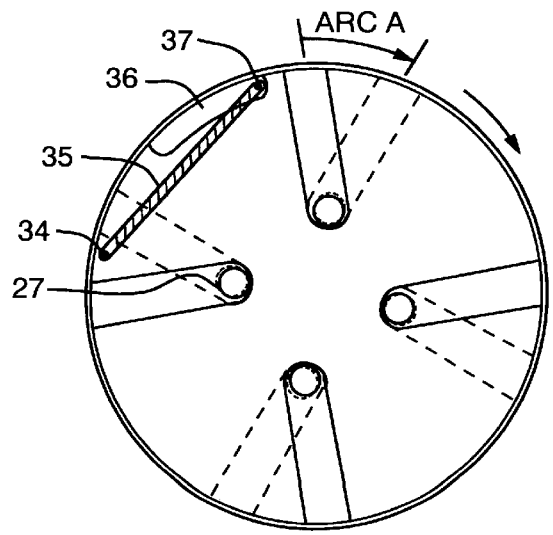
FIG. 5C
FIG. 5D

CAM FOLLOWER AUTOMATIC TORQUE CONVERTER TRANSMISSION

BACKGROUND—FIELD OF INVENTION

This invention relates to an automatic transmission suitable for bicycles.

The vast majority of commercially available multi-speed bicycles are equipped with a chain-driven transmission of the type generically referred to as "derailleurs".

Although bicycles equipped with derailleur-type transmissions dominate the commercial market, they have many functional and operational problems which detract from their popularity. More specifically, derailleurs are made of a large number of exposed, delicate parts, which require frequent maintenance and adjustment. In addition, derailleur transmissions are hard to operate, since the operator must cognitively decide whether to actuate one or both derailleurs, to produce the desired gear change. Also derailleurs are typically noisy and prone to inefficiency due to chain misalignment and/or riders failure to completely derail the chain between sprocket rings. Furthermore, front derailleur systems can not be shifted smoothly while the chain is under load which, in turn, limits the capacity of the bicyclist to go smoothly, through the terrain encountered, which required the gear change. Finally, it is difficult to remove and reassemble the rear wheel of a multi-speed bicycle equipped with derailleur-type transmission.

In an effort to overcome the above-noted and other shortcomings associated with derailleur equipped bicycles, a plethora of alternative variable ratio transmissions have been proposed. Usually, such alternative transmissions are of the type generically referred to as "variable sprocket" transmissions, in which the effective diameter of a segmented front sprocket is selectively varied with respect to a constant diameter rear driven sprocket, for establishing different speed ratios between them.

From a pure engineering standpoint, such variable sprocket transmissions are superior to derailleur-type transmissions, since they can change speed under power in a very smooth manner. Also, different speed ratios are evenly sequenced for ease of operation. However, variable sprocket transmissions also have their shortcomings.

Although variable sprocket transmissions have been known for more than 20 years, they have not gained commercial acceptance. This is mainly due to their complexity and vast number of parts, which add to the cost of production, weight of the bicycle and susceptibility to mechanical failure. Furthermore in most cases in the above group, the variable diameter pulleys are applied only to the pedal crank, which results in a very limited gear ratio range.

In view of the above, there is a need to develop an automatic transmission for multi-speed bicycles which overcomes the deficiencies known in the prior art. It should be relatively simple in structure, compact and reliable in operation.

A patent search by the present inventor, failed to find a single transmission in which cam followers are the basis.

OBJECTS AND ADVANTAGES

Accordingly, my invention provides a compact, torque actuated, infinitely variable automatic transmission which can be further described as follows:

(a) It has gear limits that greatly surpass those of prior art systems, ability to down-shift while at a standstill, delayed up-shifting in order to save energy and no worrisome gearshift levers;

(b) The unit, factory assembled and operating in an oil bath, affords quiet, long life and singular freedom from maintenance and repair;

(c) It is coaster brake compatible and existing bicycles may be fitted with my invention; and (d) My invention provides a simpler and more reliable transmission than derailleurs.

Further objects and advantages of my invention will become apparent from a consideration of the drawings and ensuing description.

FIGS. 5A to 5D show down shifting by a transmission unit with rather radial driver and follower wheel cams.

SUMMARY

The object of my invention is to provide a transmission unit which can be used either to convey an infinitely variable force between bicycle pedals and the rear bicycle wheel, or to convey an infinitely variable force from a motor to a load.

The basis of the transmission unit of my invention is the observation that the periphery of a driven wheel turns with greater speed, but lessor torque, than axial areas. The transmission unit of my invention, in effect, links the perimeter of the rear sprocket to either the perimeter of the pedal sprocket, or to more central points of the pedal sprocket.

Figure 1:
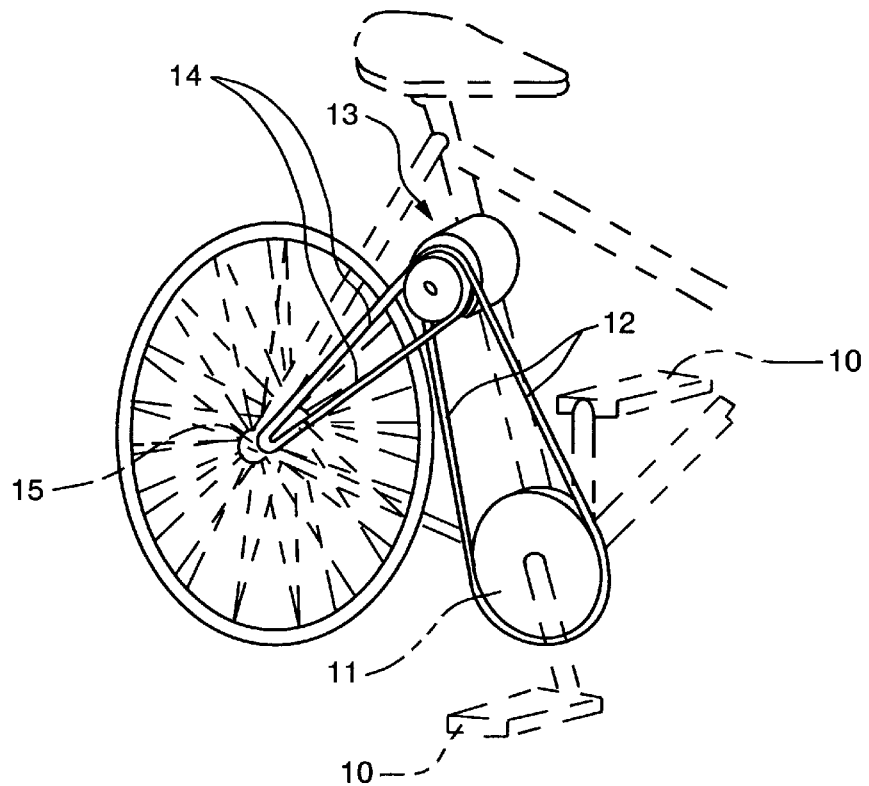
FIG. 1 shows a bicycle equipped with a transmission unit of my invention.
Figure 3:
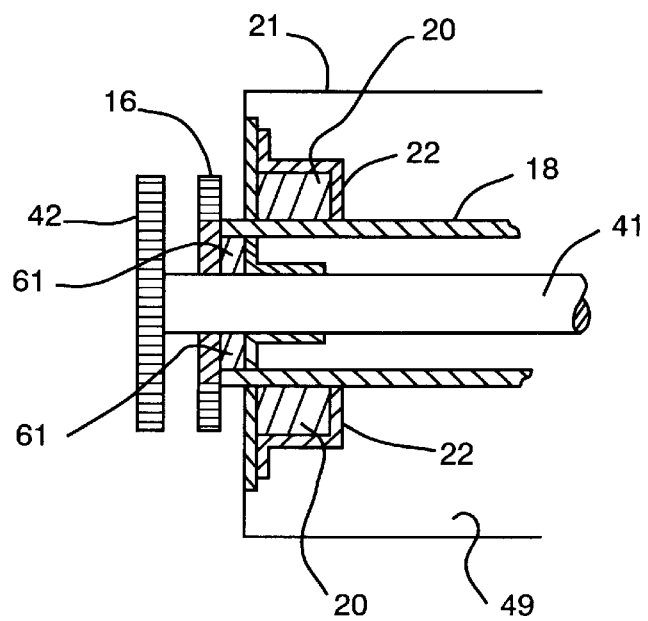
FIG. 3 shows a cross section of the oil seals around the input and output shafts.
Figure 2:
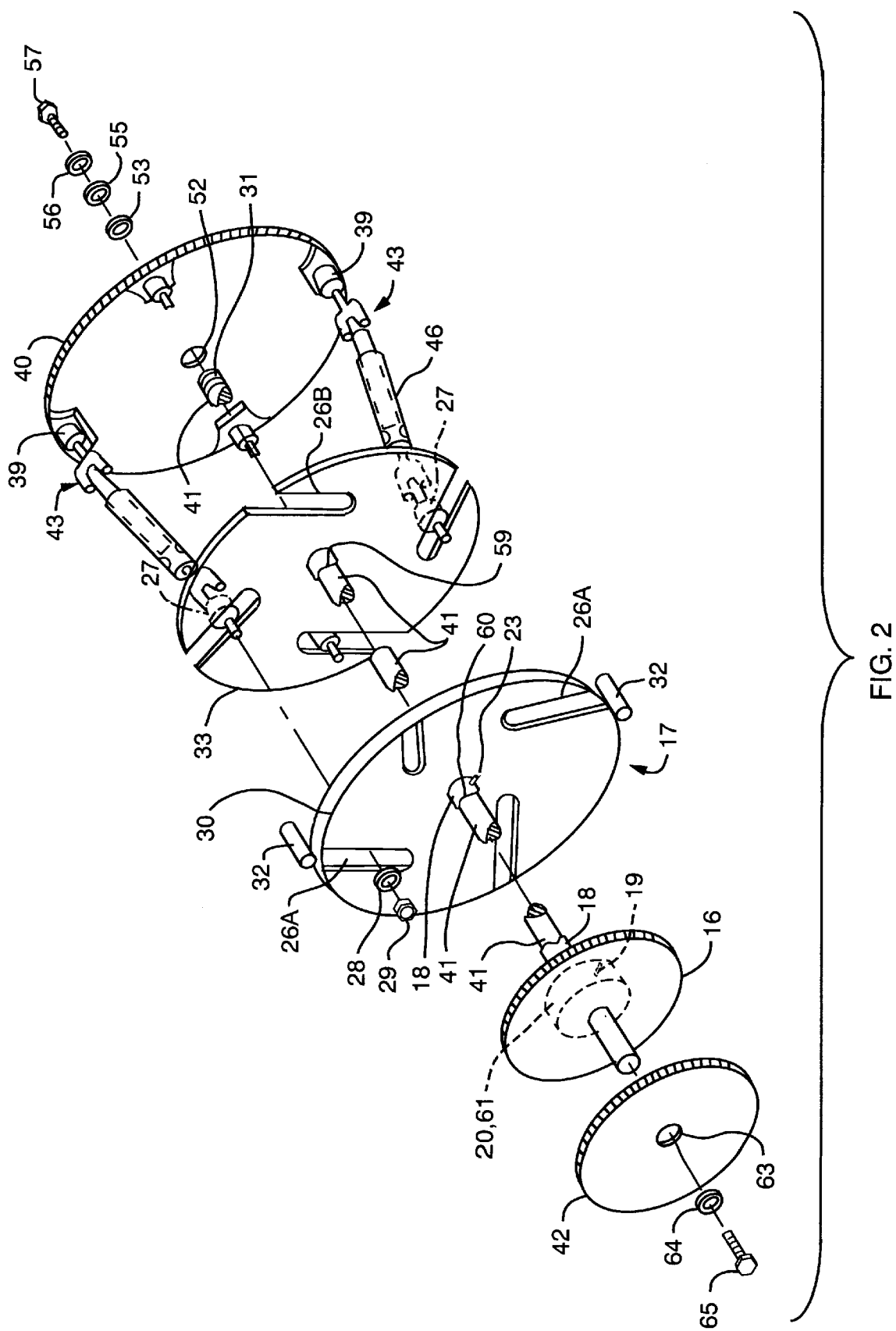
FIG. 2 is an isometric exploded view of a transmission unit of my invention.
Figure 4:
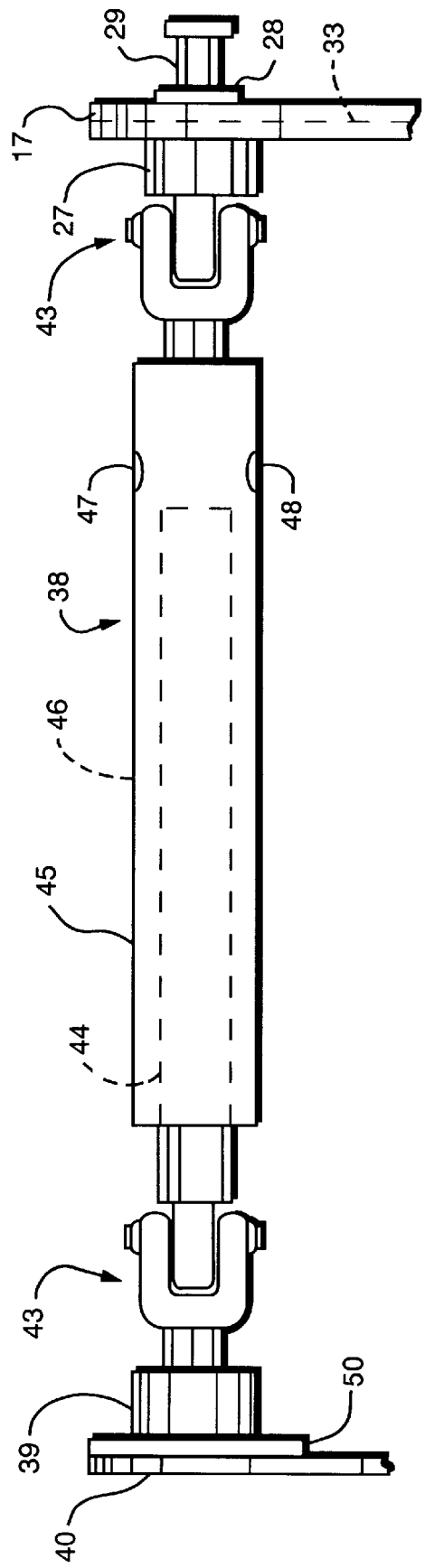
FIG. 4 shows a cam follower, cam follower shaft and cam shaft adaptor.

Operation—FIGS. 1, 2, 3

FIG. 1 shows a perspective view of a bicycle fitted with my invention. Bicycles equipped with my transmission units have no gear shift levers and no handbrakes. The system is coaster brake compatible.

Pursuant to a preferred construction, my transmission systems for bicycles include pedals 10, pedal sprocket 11, input chain 12, transmission unit 13, output chain 14 and rear sprocket 15.

FIG. 2 is an isometric exploded view of a transmission unit. When torque is applied to pedals 10, the force is conveyed to input sprocket 16, by pedal sprocket 11 with which it is aligned, and input chain 12. This force is carried to driver wheel 17 by input shaft 18, which is attached to input sprocket 16 by key 19, and has bearings and oil seal 20, attached to casing 21 by brackets 22. Input shaft 18 is attached to driver wheel 17, by key 23.

Driver wheel 17 has three or more cam slots 26A and an equal number of cam followers 27, which are attached by hardware including washers 28 and bolts 29. Driver wheel 17 has a substantial rim 30, which contacts thrust bearings 32, mounted on casing 21.

Follower wheel 33 has the same number of cam slots 26B as driver wheel 17 and its cam pattern is a mirror image of that of a driver wheel 17. It fits within the rim 30 of driver wheel 17, and has post 34 near its periphery, to which torque-spring 35 is attached. See FIG. 5B. Section of the perimeter 36 of follower wheel 33, near post 34 is removed for access to and movement of post 37, on driver wheel 17. Torquespring 35, mounted on posts 34 and 37, is stressed to oppose movement of cam followers 27 from their "no torque" positions. In their "no-torque" positions, cam followers 27 are on the periphery of cam follower wheel 33 and in contact with rim 30 of driver wheel 17. When they are in this position, insufficient torque to exceed stress of torquespring 35 is being applied to pedals 10.

Driver wheel 17 through input shaft 18 is connected to pedal power and follower wheel 33 through cam followers 27, cam follower shafts 38, cam shaft adaptors 39, output wheel 40, output shaft 41, output sprocket 42 and output chain 14, which is connected to the load, which, in the absence of torquespring 35, would cause follower wheel 33 to lag driver wheel 17. However, torque spring 35 will maintain cam followers 27 in their no-torque positions until torque transmitted to driver wheel 17 exceeds tension force of torque-spring 35. When this happens, cam followers 27 move to more central positions on follower wheel 33.

Cam follower shafts 38 connect cam followers 27 to cam shaft adaptors 39 and these are connected to output wheel 40. Cam follower shafts 38 undergo pumping radial movements. In order to function smoothly, they have knuckle joints 43 for bending and cylinders 44 within cylinders 45 which allow pumping motion. Air-tight chambers 46 formed by cylinders 44 and 45, communicate with input valves 47 and small apertures 48. Movement of cam followers 27 to more central positions on follower wheel 33, lengthens cam follower shafts 38, which causes partial vacuums in air-tight chambers 46. Oil 49, which fills the voids within casing 21, enters air-tight chambers 46, through input valves 47, which close as cam followers 27 begin returning to their no-torque positions, thereby reducing size of air-tight chambers 46 and putting pressure on entrapped oil, which is forced out through small apertures 48, slowing return of cam followers 27 to their no-torque positions and thus delaying up-shifting.

Cam shaft adaptors 39 are connected to cam follower shafts 38 and to output wheel 40, by welds 50.

Output wheel 40 is connected to output shaft 41 by threads 31, threaded hole 52, and hardware including washer 53, washer 55, washer 56, and bolt 57. Output shaft 41 passes through clearance holes 59 and 60, through bearing and oil seal 61 and is connected to output sprocket 42 by threaded hole 63 and hardware including washer 64 and bolt 65.

Figure 6A:
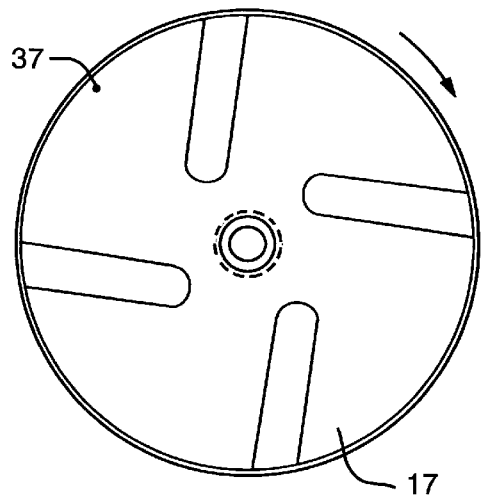
FIGS. 6A to 6D show downshifting by a transmission unit with more chordal driver and follower wheel cams.
Figure 6B:
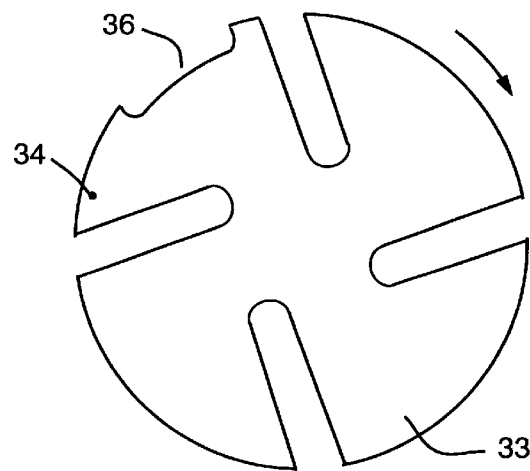
Figure 6C:
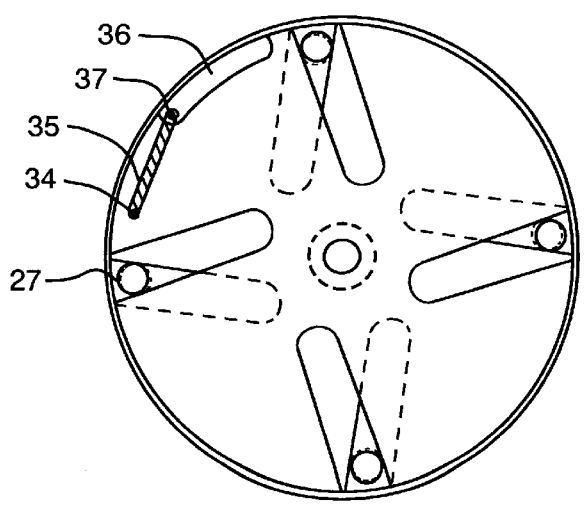
Figure 6D:
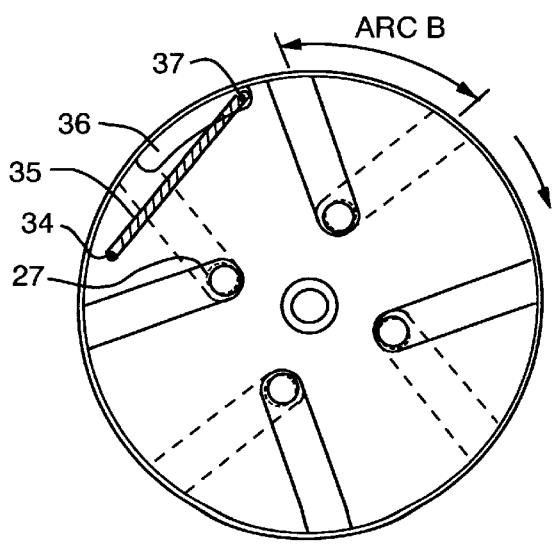

Cam designs determine the shifting characteristics of the transmission unit of my invention. Chordal cam slots, see for example driver wheel of FIG. 6A and follower wheel of FIG. 6B, allow more wheel movement (arc B) than more radial cam slots, see for example driver wheel of FIG. 5A and follower wheel of FIG. 5B, which allow less wheel movement (arc A). Therefore a transmission unit made with driver wheel and follower wheel combination of FIG. 5A and FIG. 5B, all other things being equal, requires less pedal torque for maximum down-shifting than the chordal combination, see for example driver wheel of FIG. 6A and follower wheel of FIG. 6B. Both of these wheel combinations provide transmisison units with linear torque responses to pedal torque, or in other words, the amount of down-shifting is directly proportional to increase of pedal torque.

Figure 7A:
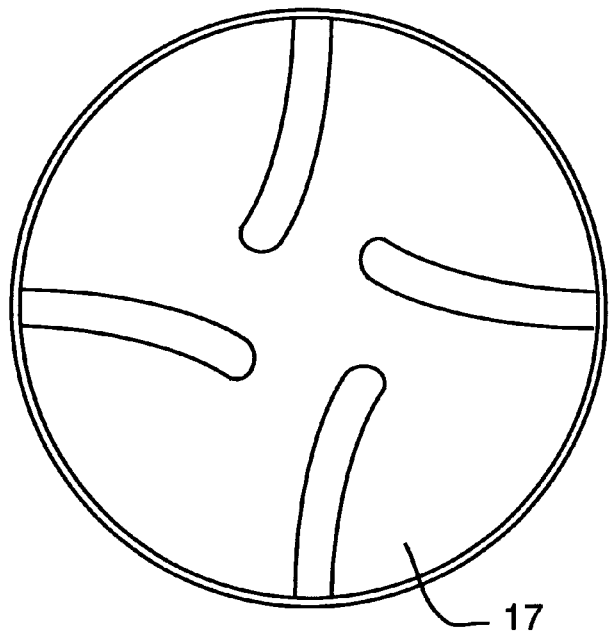
FIGS. 7A and 7B show driver and follower wheel combination which give a transmission unit a non-linear response to torque.
Figure 7B:
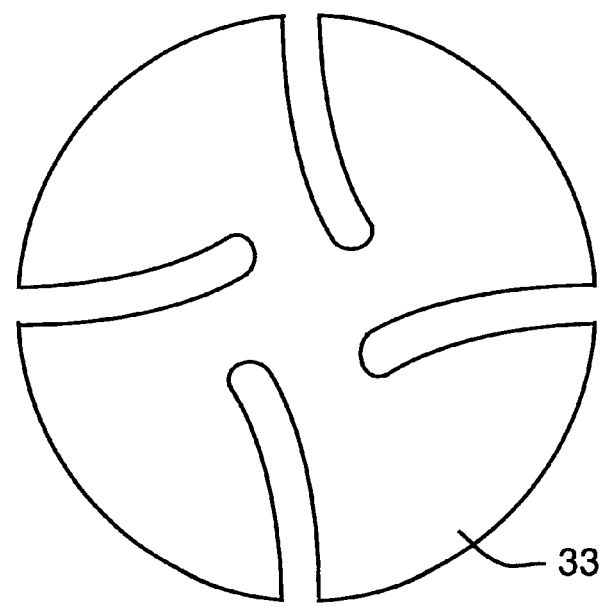

Curving cam slots installed in transmission units, see for example driver wheel of FIG. 7A and follower wheel of FIG. 7B, provide transmission units with non-linear response to increase of pedal torque.

Mechanical advantage of transmission units increases with approach of cam followers toward the center of a wheel, but the physical stability of a wheel is threatened by cams cut to points close to its center.

Although the description contains many specificities, these should not be construed as limiting the scope of the invention, but merely providing illustrations of some of the presently preferred embodiments of the invention.

I claim:

1. An automatic torque converter transmission comprising:

an input drive shaft;

a slotted cam driver wheel drivingly connected to said input drive shaft;

a slotted cam follower wheel rotatably mounted on said input drive shaft;

a plurality of cam followers slidably connecting said cam driver wheel and said cam follower wheel;

means for varying a radial position of said cam followers on said cam driver wheel and said cam follower wheel including means for opposing movement of said cam followers from an outer radial position toward an inner radial position;

an output wheel rotatably mounted on said input drive shaft;

an output shaft drivingly mounted on said input wheel;

means for connecting said cam followers to peripheral points of said output wheel; and means for delaying a return of said cam followers toward said outer radial position.

2. The combination set forth in claim 1 wherein said means for varying a radial position of said cam followers is torque responsive.

3. The combination set forth in claim 1 wherein cam slots of said slotted driver wheel are linear.

4. The combination set forth in claim 1 wherein cam slots of said slotted driver wheel are non-linear.

5. The combination set forth in claim 1 wherein cam slots of said slotted follower wheel are non-linear.

6. The combination set forth in claim 1 wherein cam slots of said follower wheel are linear.

* * * * *